United States Patent [19]

Levy

[11] 4,103,055
[45] Jul. 25, 1978

[54] POROUS STRUCTURE

[75] Inventor: Fernand Jacques Levy, Paris, France

[73] Assignee: Avions Marcel Dassault-Breguet Aviation, Vaucresson, France

[21] Appl. No.: 689,042

[22] Filed: May 24, 1976

[30] Foreign Application Priority Data

May 26, 1975 [FR] France .............................. 75 16307

[51] Int. Cl.² .......................... B32B 5/12; B32B 7/14; D04H 1/58
[52] U.S. Cl. .................................... 428/113; 428/114; 428/232; 428/247; 428/252; 428/255; 428/259; 428/265; 428/272; 428/288; 428/294; 428/902; 428/198
[58] Field of Search ................. 244/123; 428/113, 114, 428/902, 232, 247, 252, 255, 259, 265, 272, 288, 294, 198

[56] References Cited

U.S. PATENT DOCUMENTS

| 3,266,130 | 8/1966 | Glaze | 244/123 |
|---|---|---|---|
| 3,491,055 | 1/1970 | Talley | 428/902 |
| 3,819,461 | 6/1974 | Saffadi | 428/902 |
| 3,859,158 | 1/1975 | Park | 428/247 |
| 3,946,127 | 3/1976 | Eisenmann et al. | 428/114 |
| 3,953,641 | 4/1976 | Marquis | 428/902 |
| 3,997,697 | 12/1976 | Brochier | 428/902 |

OTHER PUBLICATIONS von Braun, "Fuel Saving Aircraft", Popular Science, Sep. 1976, pp. 80–83, 161.

Primary Examiner—William R. Dixon, Jr.
Attorney, Agent, or Firm—William J. Daniel

[57] ABSTRACT

The invention relates to a structure of open porosity in the form of a flat or curved panel made up of superposed layers of fibres with the orientation of the fibres varying from one layer to the next. The fibres are boron filaments held parallel in each layer by criss-crossing of filaments with another type. The boron filaments are bonded together at their crossing points to join superposed layers.

The invention also provides a method of making such porous structure.

4 Claims, 8 Drawing Figures

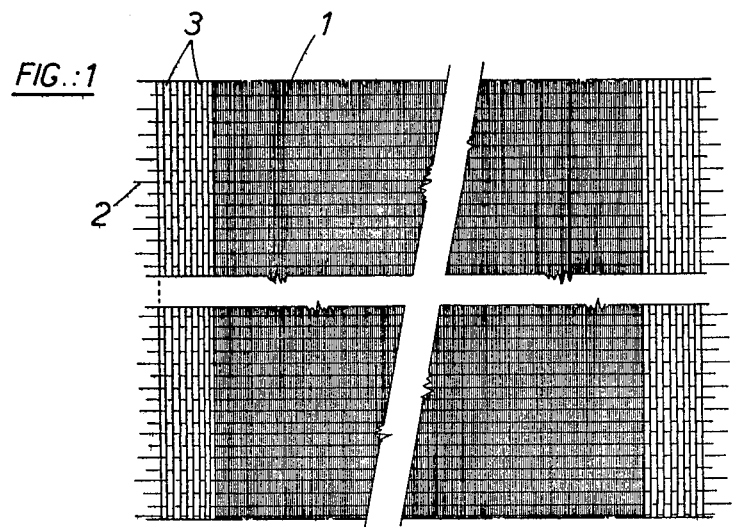
FIG.:1
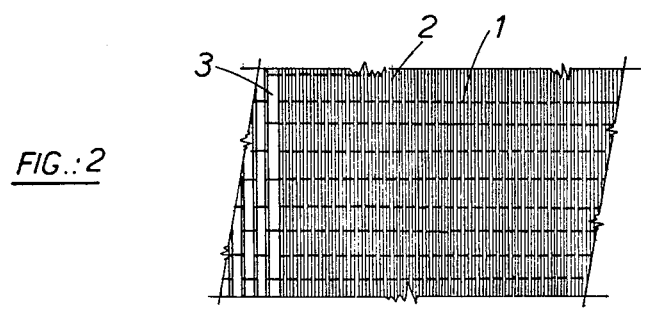
FIG.:2
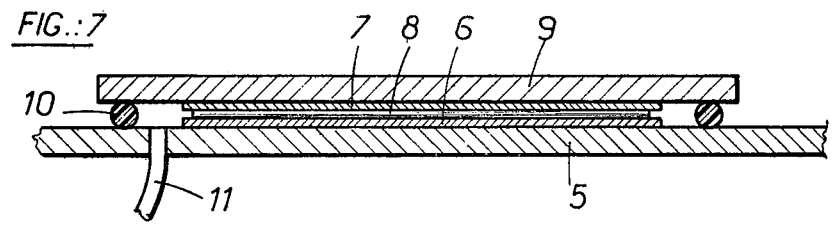
FIG.:7
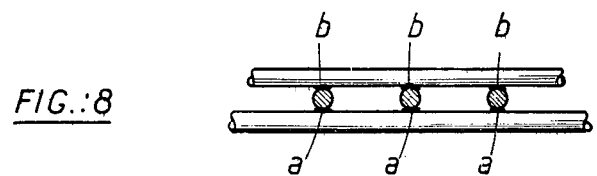
FIG.:8

FIG.:3
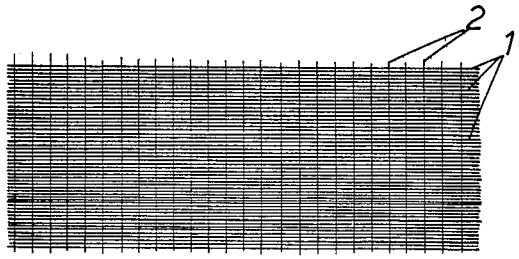
FIG.:4
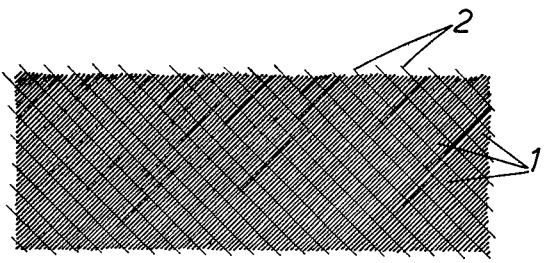
FIG.:5
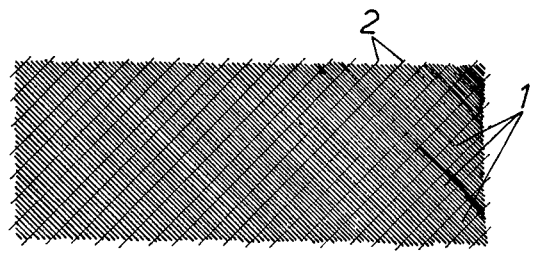
FIG.:6
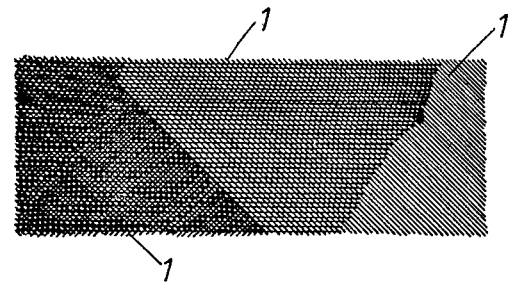

POROUS STRUCTURE

The invention is concerned with porous structures, usable in particular for forming walls or wall coverings.

In certain applications the problem arises of making walls or wall coverings having a definite porosity and with open pores, that is pores which pass right through the structure, which is therefore permeable.

In particular, this is the case with the walls of aircraft in certain areas of the aerofoils and fuselage, with the walls of the air intakes of the engines, with the walls of wind tunnels, etc..

The porosity of these walls enables the boundary layer to be sucked in and so contributes to the damping out of pressure fluctuations and to improving the resorption of the shock wave near these walls.

An object of the invention is to provide wall forming components with accurately defined porosity and good mechanical strength combined with relatively low weight, in the form of flat or curved panels which can be placed side by side to make up continuous walls.

Boron filaments can now be produced on an industrial scale. These filaments consist of a core, usually of tungsten, but also of glass, carbon, and other materials, covered with a layer of boron by a physico-chemical process.

They have very high tensile strength and a very high modulus of elasticity, higher which is even than that of steel.

A characteristic feature of the invention is the use of boron filaments for making the bodies of porous components, the filaments being made up beforehand into sheets in which the boron filaments are held parallel to one another in the same plane by weaving them together with textile yarns of synthetic materials, glass, or other materials.

Another characteristic feature of the invention is that the appropriate number of superposed sheets, preferably offset angularly, are held against one another by bonding together the boron wires of the sheets at their points of intersection, by means of a synthetic resin, for example.

The following description, given by way of non-limiting example and with reference to the accompanying drawings, will explain how the invention may be carried out, the features revealed by the drawings constituting just as much a part of the invention as those which described in the text.

FIG. 1 shows part of a sheet of boron filaments such as can be made by weaving.

FIG. 2 shows part of this sheet on a larger scale.

FIGS. 3 to 5 show the manufacture of a porous wall component in accordance with the invention, made up of three superposed sheets of boron filaments.

FIG. 6 shows the wall component as finally obtained, partly cut away to show the three successive layers.

FIG. 7 is a cross section through a compressing device showing the final step in the manufacture of a porous wall component according to the invention.

FIG. 8 is a highly enlarged diagrammatic view showing the bonding together of the boron filaments of the three superposed sheets.

FIGS. 1 and 2 show part of a sheet of basic boron filaments 1 which are aligned parallel with one another (the filaments are vertical in the drawing), and held in this state, without any coating or bonding, by holding filaments 2 of a synthetic material, polyester, for example, or of glass, which are perpendicular to the boron filaments. The holding filaments 2 are spaced from one another by a few millimeters, whereas the basic boron filaments 1 have a smaller space between them, which will be one of the factors controlling the porosity in the method according to the invention.

On either side of the sheet, the holding filaments 2 are extended for a few millimeters, the extensions being interwoven with filaments 3 of synthetic material, polyester, for example, or of glass, parallel to the basic boron filaments, forming safety borders on each side of the latter to prevent them separating, it being possible to cut off this edge portion before using the sheet.

To make such sheets on a loom, it is advantageous to arrange the holding filaments 2 as the warp and the basic boron filaments 1 as the weft, which enables a sheet of any desired length to be made with a single spool of boron filament, the width being limited by the width of the loom (in FIG. 1 the length is the horizontal dimension and the width the vertical dimension).

Pieces of the required shape and size can be cut from such a sheet by any appropriate method.

In order to make the above-described porous structure in accordance with the invention, one proceeds as follows, assuming for example, that the number of associated sheets is three. Generally speaking, this number would not be enough, but it has been chosen to simplify the description and to explain the invention.

It will also be assumed, for the sake of example, that flat, rectangular wall components are to be made.

A first rectangular piece shown in FIG. 3 is cut from a sheet woven as above, of the same size as the component to be made and with the boron filaments parallel to the longer sides of the rectangle. This piece is then lightly coated with liquid epoxy resin, using a brush for example.

Only the minimum amount of resin required to coat the boron filaments is used, and the layer is pressed for several minutes between absorbent sheets of glass cloth, blotting paper, etc., to remove all excess resin so as to leave only a thin film of the latter on each boron filament.

The pieces shown in FIGS. 4 and 5 are also cut from the sheet, with the same shape and size as that shown in FIG. 3, but angling the cuts so that, with the longer sides of the three cut-out rectangles parallel, the boron filaments of the piece shown in FIG. 4 are at an angle of +45° to those of the piece shown in FIG. 3, and those of the piece shown in FIG. 5 are at an angle of −45°.

One proceeds to coat these two pieces with the same liquid resin in the same way as described above.

The three pieces are then put on top of one another in the order: piece shown in FIG. 5: −45°, piece shown in FIG. 3: 0°, and piece shown in FIG. 4: +45°.

Once this assembly (shown in FIG. 6) has been carried out, the pile is sandwiched between two layers of a perforated separator film of plastics material, these being in turn covered with a layer of absorbant woven material. The assembly is placed on a rigid former 5 of the same shape as the final component. In the example of FIG. 7, it is supposed that the former 5 is flat.

FIG. 7 also shows the absorbant layers 6, 7 and the layers of boron filaments 8 covered with the perforated film.

The whole is topped off with a plate 9 of a flexible material, which is larger than the sandwich so that its edges extend beyond those of the sandwich, this plate resting on a flexible and compressible sealing ring 10 which surrounds the sandwich.

The former 5 is provided with a vent 11 which can be connected to a vacuum pump, so that the plate 9 applies pressure to the sandwich.

A pressure of 0.8 kg/cm² is suitable, so a high vacuum is not required.

The pressure is maintained for as long as it takes to polymerise the resin, and the device is placed in a heated enclosure if the resin is one that is polymerised by heat.

After polymerisation, the sandwich can be removed from the mould and the absorbant layers 6, 7 and perforated film removed.

The product consists of a very hard plate which is light, has a well defined porosity, and a high resistance to crushing and bending.

In fact, the removal of all excess resin during the manufacturing process leaves resin only in the small capillary spaces between the boron filaments of the sheets at the points where they cross.

The basic boron filaments of the sheets are thus bonded together in the areas *a–b* marked with a thickened line in FIG. 8, the final product having, from one surface to the other, interstices defined with a certain degree of accuracy, as a result of the good alignment of the boron filaments in the original sheets, combined with accurate spacing, and of the fact that the filaments are very hard and do not become deformed when compressed.

These interstices depend in fact on the diameter of the boron filaments, the number of boron filaments per centimeter counted in the horizontal direction in FIG. 1, and on the number and orientations of the superposed layers.

Among the boron filaments on the market, those with diameters of 100 and 140 microns are particularly suitable for carrying the invention into effect.

The number of boron filaments per centimeter can be varied, as it is only necessary to appropriately adjust the loom on which the sheet of boron filaments is woven.

It is possible, for example, to make sheets with between roughly 18 and 40 boron filaments per centimeter.

Finally, the number of crossed layers, which will most often be odd and greater than three, can be five, seven, nine, 11, or 13.

The porosity naturally decreases as one or more of the following factors is increased: the diameter of the boron filaments, the number of boron filaments per centimeter, the number of crossed layers. For a given number of crossed layers, the orientation of the boron filaments of the layers may also play a role.

EXAMPLE I

A sheet of boron filaments 140 microns in diameter containing 18 filaments per centimeter was selected. From this sheet were cut nine rectangular pieces, with the following orientation of the filaments:

1st piece: 0°
2nd piece +45°
3rd piece 90°
4th piece −45°
5th piece 0°
6th piece 31 45°
7th piece 90°
8th piece 30 45°
9th piece 0°

These pieces were lightly coated with an epoxy resin polymerisable in 2 hours at 180° C and the excess squeezed out as described above, and piled up and compressed as described with reference to FIG. 7, for two hours at 180° C.

The porosity of the structure obtained was measured in rayls, by placing it in the path of a current of air flowing through a conduit at a velocity of 10 meters per second. The porosity was found to be 22 rayls.

EXAMPLE 2

Using nine layers crossed as above, the same resin and casting method, but cutting the layers from sheet having 40 boron filaments with a diameter of 100 microns per centimeter, a porosity of 50 rayls was found using the same method of measurement.

It goes without saying that these examples are not limiting.

For example, five layers of boron filaments could be used, orientated at +30, −30, 0, +60 and −60°.

It goes without saying that the embodiments described have been given by way of example only and can be modified, especially by substituting technical equivalents, without departing from the scope of the invention.

I claim:

1. A high-strength panel structure of accurately predetermined porosity comprising an assembly of at least about 5 superposed fabric layers each composed of basic boron mono-filaments maintained in parallel closely-adjacent relationship by non-boron transverse yarns interwoven therewith, the number of boron mono-filaments in each said layer ranging from about 18 to about 40 per centimeter and the spacing between said transverse yarns being substantially larger than the spacing between said boron filaments, the lenghwise direction of the boron filaments of each layer extending at an angle with the lengthwise direction of the parallel boron filaments of the next successive layer so that the boron filaments of adjacent layers intersect each other at a multiplicity of pinpoint crossing points, and a bonding material external to said boron filaments for holding said layers in said assembly, said bonding material being essentially confined to said pinpoint crossing points.

2. The structure of claim 1, wherein said boron mono-filaments have a diameter of about 100–140 microns.

3. A structure as claimed in claim 1, wherein each such layer comprises, per centimeter, about 18 boron mono-filaments of about 140 microns diameter.

4. A structure as claimed in claim 1, wherein each layer comprises, per centimeter, about 40 boron mono-filaments of about 100 microns diameter.

* * * * *